US012054328B1

(12) United States Patent
Balschi, III et al.

(10) Patent No.: US 12,054,328 B1
(45) Date of Patent: Aug. 6, 2024

(54) PACKAGING MATERIAL WITH CONCEALED PLATE BREAKS

(71) Applicant: Printpack Illinois, Inc., Elgin, IL (US)

(72) Inventors: Stephen Jay Balschi, III, Acworth, GA (US); David Welch, Arden, NC (US)

(73) Assignee: Printpack Illinois, Inc., Elgin, IL (US)

( * ) Notice: Subject to any disclaimer, the term of this patent is extended or adjusted under 35 U.S.C. 154(b) by 351 days.

(21) Appl. No.: 16/657,145

(22) Filed: Oct. 18, 2019

Related U.S. Application Data

(60) Provisional application No. 62/747,705, filed on Oct. 19, 2018.

(51) Int. Cl.
*B41M 1/04* (2006.01)
*B41M 1/18* (2006.01)
*B65D 65/38* (2006.01)

(52) U.S. Cl.
CPC ............... *B65D 65/38* (2013.01); *B41M 1/04* (2013.01); *B41M 1/18* (2013.01); *B41P 2200/12* (2013.01); *B65D 2203/00* (2013.01)

(58) Field of Classification Search
CPC . B41F 30/04; B41M 1/18; B41M 1/04; B65D 65/38; B65D 2203/00; B41P 2200/12
See application file for complete search history.

(56) References Cited

U.S. PATENT DOCUMENTS 4,635,550 A * 1/1987 Brands .................. B41F 27/125 101/415.1
2007/0134561 A1* 6/2007 Butterfield ................ G03F 1/50 430/5
2011/0162542 A1* 7/2011 Nakamura ............. B65D 25/34 101/483
2013/0270331 A1* 10/2013 Barros ...................... B41F 5/24 229/116.1
2014/0245909 A1 9/2014 Ramakrishnan et al.
2016/0221329 A1 8/2016 Van Ostrand
2016/0375718 A1* 12/2016 Van Garsse ........... G06F 3/1251 52/311.1

* cited by examiner

*Primary Examiner* — Jennifer Bahls
*Assistant Examiner* — Quang X Nguyen
(74) *Attorney, Agent, or Firm* — Additon, Pendleton & Witherspoon, P.A.

(57) ABSTRACT

In a method of printing a product, a plate gap can be at least partially concealed, and the presence of any trap lines can be minimized. The background of each impression can be printed to include a gradient region along the leading and trailing edges of the background adjacent to the plate gap. An overprint ink/layer can be printed over the plate gap and at least a portion of the background gradient regions. The overprint ink/layer can be printed to include gradient regions along the leading and trailing edges of the overprint. The overlapping gradient regions of the background and of the overprint soften or obscure the appearance of any trap lines that would otherwise be more prominent in the overlapping areas.

16 Claims, 6 Drawing Sheets

PACKAGING MATERIAL WITH CONCEALED PLATE BREAKS

CROSS-REFERENCE TO PRIORITY APPLICATION

This application claims the benefit of U.S. Provisional Patent Application No. 62/747,705 filed Oct. 19, 2018, which is hereby incorporated by reference in its entirety.

BACKGROUND

The present invention generally relates to printing and, more particularly, to package printing (e.g., flexographic printing).

In flexographic printing, the existence of plate gaps (or plate breaks) between adjacent impressions (i.e., the image produced in a single operation on a flexographic printing machine) is well known. This break or gap in printing corresponds to, and results from, the seam between the two ends of the flexographic plate.

In some instances, it may be desirable to have a continuous background color, such that there are no plate gaps or breaks. In such instances, it is common to use a "breaker bar" (or "cover-up bar") to apply additional ink having the same color as the background to cover the gap. The breaker bar generally has a width that is wider than the plate gap width to ensure complete coverage of the substrate in and along the gap. As a result, darkened lines (sometimes referred to as "trap" or "trap lines") often appear in the overlapped printing areas. While this might be acceptable for some printing applications, it might be considered an unacceptable defect in others.

Laser-engraved, continuous rolls are sometimes used as an alternative means of eliminating this gap. However, these rolls are costly and time-consuming to produce.

Thus, there is a need for a simple, cost-effective method of printing in which the gap is substantially concealed and the appearance of trap lines are minimized. There is further a need for printed materials formed using such a method.

SUMMARY

In one aspect, the present disclosure is directed to a method of printing a product, such as a packaging material, in which plate gaps or breaks are substantially concealed and the presence of any highly visible trap lines can be minimized. The method generally includes printing the background of each impression to have a gradient region along the leading and trailing edges of the background adjacent to the plate gap/break, and printing an overprint ink/layer over the plate gap/break and at least a portion of the background gradient regions. The overprint ink/layer is likewise printed to include gradient regions along the leading and trailing edges of the overprint. The overlapping gradient regions of the background and of the overprint soften or obscure the appearance of trap lines that would otherwise be more prominent in the overlapping areas.

As another example, an aspect of this disclosure is the provision of a method including printing at least one impression on a substrate so that a gradient edge region of the at least one impression extends along an edge of the at least one impression, and printing an other impression on the substrate so that an overlap area comprises an overlapping or underlapping relationship between at least a portion of the gradient edge region and at least a portion of an edge region of the other impression. The gradient edge region can be configured to at least partially obscure any variation between the overlap area and a medial region of the at least one impression. For example, coverage of the ink of the gradient edge region can increase in a direction from the edge of the at least one impression toward the medial region of the at least one impression. As another example, the overlap area can have an ink total area coverage in a range of from about 50% to about 150%, or the ink total area coverage can be closer to about 100%.

In another aspect, the present disclosure is directed to a printed product formed from the above method(s) or process(es). For example, a packaging material can include a plurality of impressions on a substrate, wherein a gradient edge region of at least one impression of the plurality of impressions extends along an edge of the at least one impression, and an overlap area comprises an overlapping or underlapping relationship between at least a portion of the gradient edge region and at least a portion of an edge region of an other impression of the plurality of impressions. At least partially reiterating from above, coverage of the ink of the gradient edge region can increase in a direction from the edge of the at least one impression toward a medial region of the at least one impression, for at least partially obscuring any variation between the overlap area and the medial region of the at least one impression. As another example, the overlap area can have the above-discussed ink total area coverage.

The foregoing summary provides a few brief examples and is not exhaustive, and the present invention is not limited to the foregoing examples. Various other features, aspects, and advantages of the present invention will be evident from the following description and accompanying figures.

BRIEF DESCRIPTION OF THE DRAWINGS

The drawings are provided as examples. The present invention may be embodied in many different forms and should not be construed as limited to the examples depicted in the drawings.

DETAILED DESCRIPTION

The present method and resulting printed product, for example, a packaging material, are described further with respect to the following examples and accompanying figures.

Figure 1A:
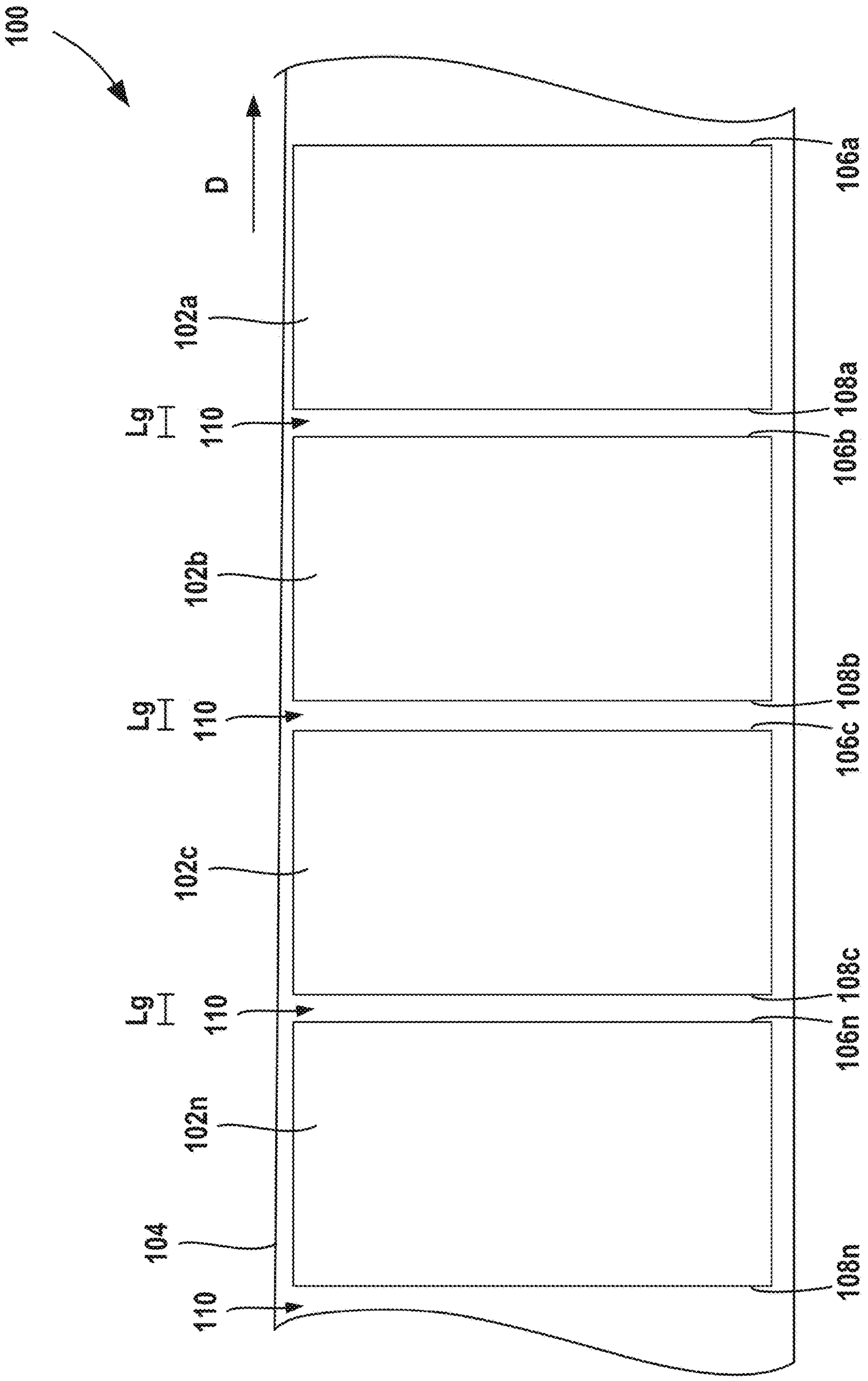
FIG. 1A is a schematic top view of a lengthwise, cut-away section of a substrate carrying a series of printed impressions, in accordance with an exemplary process of this disclosure.

Turning to FIG. 1A, in one step of an exemplary process 100 for making a printed material, a plurality of impressions 102*a*, 102*b*, 102*c*, . . . 102*n* of an image or other content are printed on a generally continuous web or substrate 104 (e.g., a polymer film) using, for example, a printing process (e.g., a flexographic printing process). The substrate 104 moves in a machine direction D during the printing process, so that each printed impression 102*a*, 102*b*, 102*c*, . . . 102*n* includes a leading edge 106*a*, 106*b*, 106*c*, . . . 106*n* and a trailing edge 108*a*, 108*b*, 108*c*, . . . 108*n* along the length of the substrate 104. A plate gap/break 110 (i.e., an initially unprinted area) having a length Lg is disposed between the trailing edge 108*a*, 108*b*, 108*c*, . . . 108*n* and the leading edge 106*a*, 106*b*, 106*c*, . . . 106*n* of each pair of adjacent impressions 102*a*, 102*b*, 102*c*, . . . 102*n*.

Figure 1B:
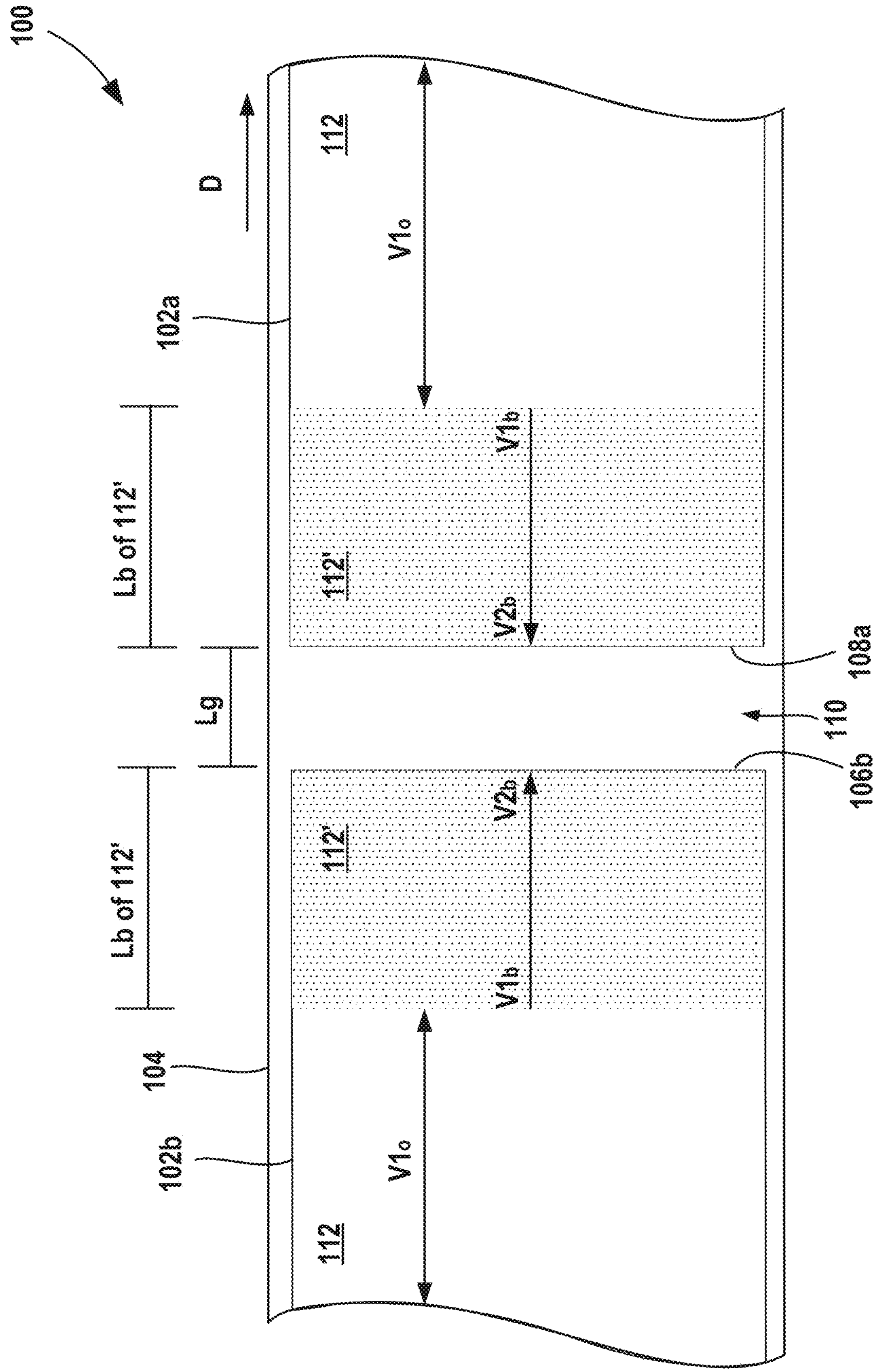
FIG. 1B is a schematic top view of a cut-away section of the substrate of FIG. 1A, wherein portions of the printed impressions are depicted as consisting of background print including gradient regions, in accordance with the exemplary process.

FIG. 1B schematically illustrates an enlarged view of one adjacent pair of the impressions 102*a*, 102*b* and the plate gap/break 110 disposed between the impressions 102*a*, 102*b*. It will be appreciated that the following discussion likewise applies to each other pair of adjacent impressions and the plate gap disposed therebetween.

In the embodiment depicted in the drawings, each impression 102*a*, 102*b* includes background print defined by background ink on the substrate 104. The background print can comprise, consist of, or consist essentially of a central or medial region 112 of background print between marginal or edge regions 112' of background print extending along the leading and trailing edge 106, 108 of each impression.

The medial background 112 of each impression 102*a*, 102*b* may generally be background ink flood/continuously coated onto the substrate 104 to provide a solid appearance. That is, in the exemplary process 100 the medial background 112 is typically printed to have an ink coverage value V1*o* of 100%. One or more “knockout areas” (e.g., voids or holes in the background print) can be defined in the flood coated medial background 112, and “knockout print” (e.g., non-background print) can be included in the knockout areas (e.g., ink that is a different color than the background ink is typically printed in the knockout areas).

In the edge regions 112' of the background print, the background ink is printed as a gradient (e.g., shown schematically in FIGS. 1B and 1C with uniform stippling) that decreases from a first ink coverage value V1*b* to a second, lower ink coverage value V2*b*, moving in a direction from the flood coated medial background 112 towards the respective leading or trailing edge 108*a*, 106*b* along the adjacent plate gap/break 110. With continued reference to FIG. 1B, the gradient background edge regions 112' may generally have an ink coverage value V1*b* of 100% (adjacent to the flood coated medial background 112) and an ink coverage value V2*b* of 0% (adjacent to the unprinted plate gap/break 110) so that the background edge regions 112' appear to fade seamlessly from the medial background 112 to the plate gap/break 110, although other possibilities are contemplated. The ink coverage value may decrease linearly along the length of each background edge gradient 112', or may decrease non-linearly if desired. The background gradient edge regions 112' have a length Lb that typically varies in each printing application, as will be discussed further below.

Figure 1C:
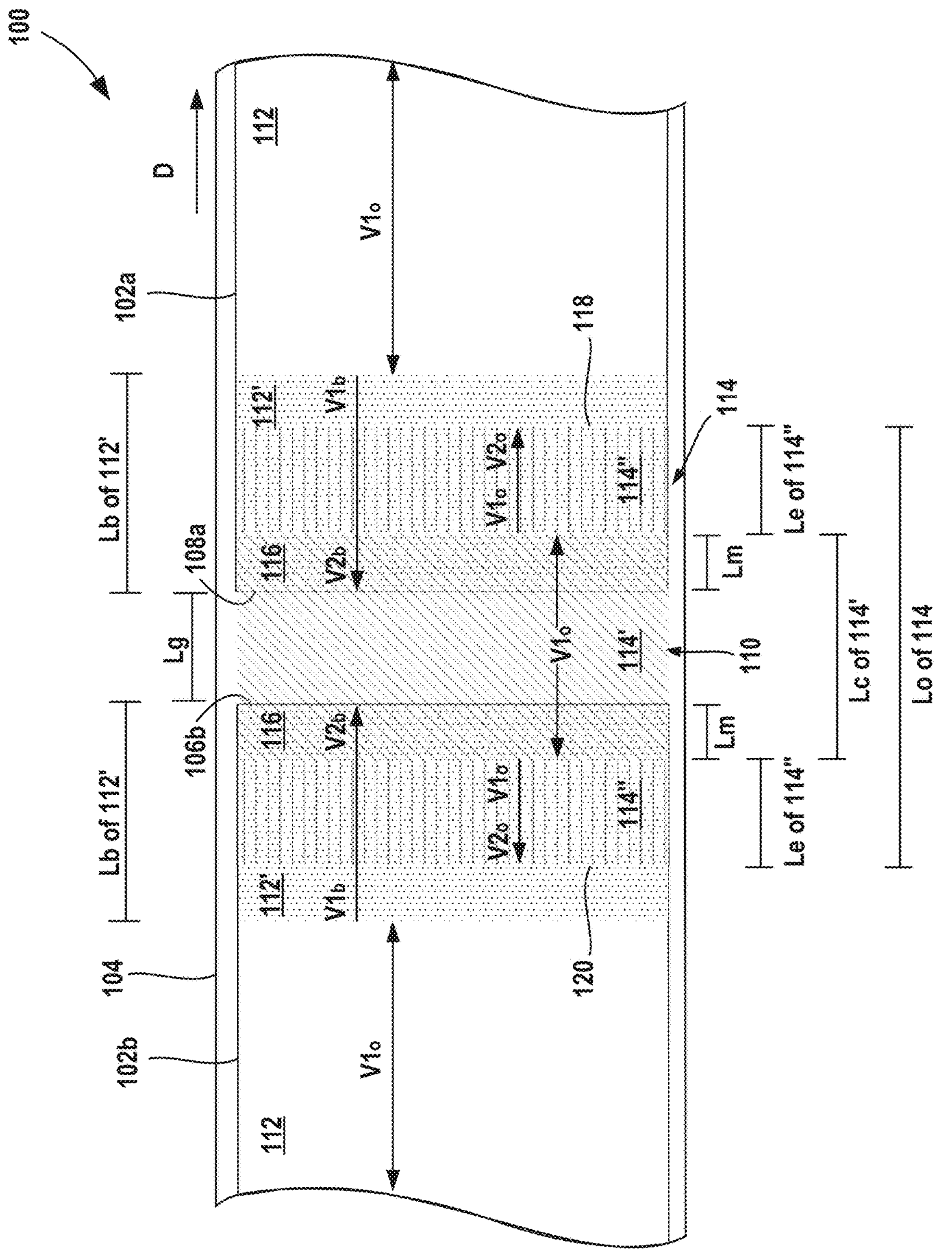
FIG. 1C schematically depicts the cut-away substrate of FIG. 1B further including an overprint that can be provided, for example, using the same ink as used in the background print, wherein the overprint includes gradient regions respectively at least partially overlapping the gradient regions of the background print, in accordance with the exemplary process.

Turning to FIG. 1C, in another step of the exemplary process 100 an overprint ink/ink layer 114 having a length Lo is applied to the printed substrate 104, for example, using a printing breaker bar (e.g., a flexographic breaker bar), so that the overprint overlies the plate gap/break 110 and a portion of each of the adjacent impressions 102*a*, 102*b*. The breaker bar can be a relatively small plate that is generally in the form of a strip. More particularly, the printed overprint 114 of the exemplary process 100 forms an impression that includes a central or medial region 114' of overprint (e.g., medial overprint 114' shown schematically in FIG. 1C with diagonal hatch lines) having a length Lc that extends across and overlies the plate gap/break 110 and marginal edge regions 116 of the impressions 102*a*, 102*b*, each of which has a length Lm.

In the exemplary embodiment 100, the overprint ink optionally can be the same as or identical to (e.g., substantially identical to) the background ink. The medial overprint 114' is printed to have an ink coverage value V1*o*, which may generally be 100% so that the ink overlying the plate gap/break 110 has the same general appearance as the flood coated medial background 112. The length Lc of the central or medial overprint 114' may generally be greater than the gap length Lg to ensure that the entire gap/break 110 is covered, and to account for the margin of error in registering the overprint impression 114 with the plate gap/break 110.

The overprint ink/layer 114 (e.g., overprint impression) further includes a pair of opposed overprint edge regions 114" (shown schematically in FIG. 1C with horizontal hatch lines) along the leading and trailing edges 118, 120 of the overprint impression 114. The overprinted edge regions 114" each have a length Le. In the overprint edge regions 114", the overprint ink (e.g., the background ink) is printed as a gradient that decreases from a first ink coverage value V1*o* to a second, lower ink coverage value V2*o*, moving in a direction away from the medial overprint region 114'. The overprint edge regions 114" may generally have an ink coverage value V1*o* of 100% along the medial overprint 114' and an ink coverage value V2*o* of 0% (distal from the medial overprint 114'), although other possibilities are contemplated. The ink coverage value may decrease linearly along the length of each overprint edge gradient 114", or may decrease non-linearly if desired.

The length Le may vary for each application. Although the overprint edge gradient regions 114" are shown as overlying only a portion of the background edge gradient regions 112', it is contemplated that Le may be greater in some embodiments, and that the overprint edge regions 114" may also overlie at least a portion of the medial background 112. The various lengths may be selected as needed to best minimize and/or obscure the existence of any light or dark bands that may occur along (e.g., in or adjacent) the overlapped areas, as will be discussed below.

It will be appreciated that in the example illustrated in FIGS. 1A-1C, the lengths of the various areas may be exaggerated for purposes of illustration.

In each of various examples, the plate gap/break 110 may generally have a length Lg of from about 0.0625 inches to about 0.3 inches. The plate gap/break 110 may generally have a length Lg of, for example, from about 0.0625 inches to about 0.1 inch. The plate gap/break 110 may generally have a length Lg of, for example, from about 0.0625 inches to about 0.09375 inches. Background edge regions 112' may generally have a gradient length Lb of up to about 0.25 inches. The background edge regions 112' may generally have a gradient length Lb of, for example, up to about 0.1 inch. The overprint impression 114 may generally have a length Lo of from about 0.625 inches to about 0.4 inches. The overprint impression 114 may generally have a length Lo of, for example, about 0.1 inch. The medial overprint 114' may generally have a length Lc of from about 0.03125 inches to about 0.3 inches. The medial overprint 114' may generally have a length Lc of, for example, from about 0.1 inch to about 0.3 inches. The marginal edge regions 116 may generally have a length Lm of up to about 0.03 inches, for example, from about 0.005 inches to about 0.05 inches. The marginal edge regions 116 may generally have a length Lm of, for example, from about 0.014 inches to about 0.021 inches. The overprint edge regions 114" may generally have a gradient length Le of up to about 0.3 inches. The overprint edge regions 114" may generally have a gradient length Le of, for example, up to about 0.1 inch. However, other possibilities are contemplated.

The various ink coverage values V1*b*, V2*b*, V1*o*, V2*o*, lengths Lb, Lo, Le and the screen rulings used to print the gradient edge regions 112', 114" may be selected or adjusted as needed to cover the plate gap, visually blend the overlapped background and overprint ink layers, and minimize the perceptible appearance of any light or dark lines or bands that might otherwise appear when printing over the plate gap.

At a given screen ruling (e.g., a gradient length of 0.01 inches), a gradient may have a length that is too short to be perceptible. Thus, the gradient length may need to be increased to soften or blur the appearance of any trap lines that may appear. Alternatively, a different line screen may need to be selected to make the appearance of the gradient more perceptible. Examples of gradient lengths that may be suitable for use with the present disclosure include, but are not limited to, those set forth above. Examples of screen rulings that may be suitable for use with the present disclosure include, but are not limited to, 133, 150, or 175 lines per inch. However, other possibilities are contemplated.

Figure 1D:
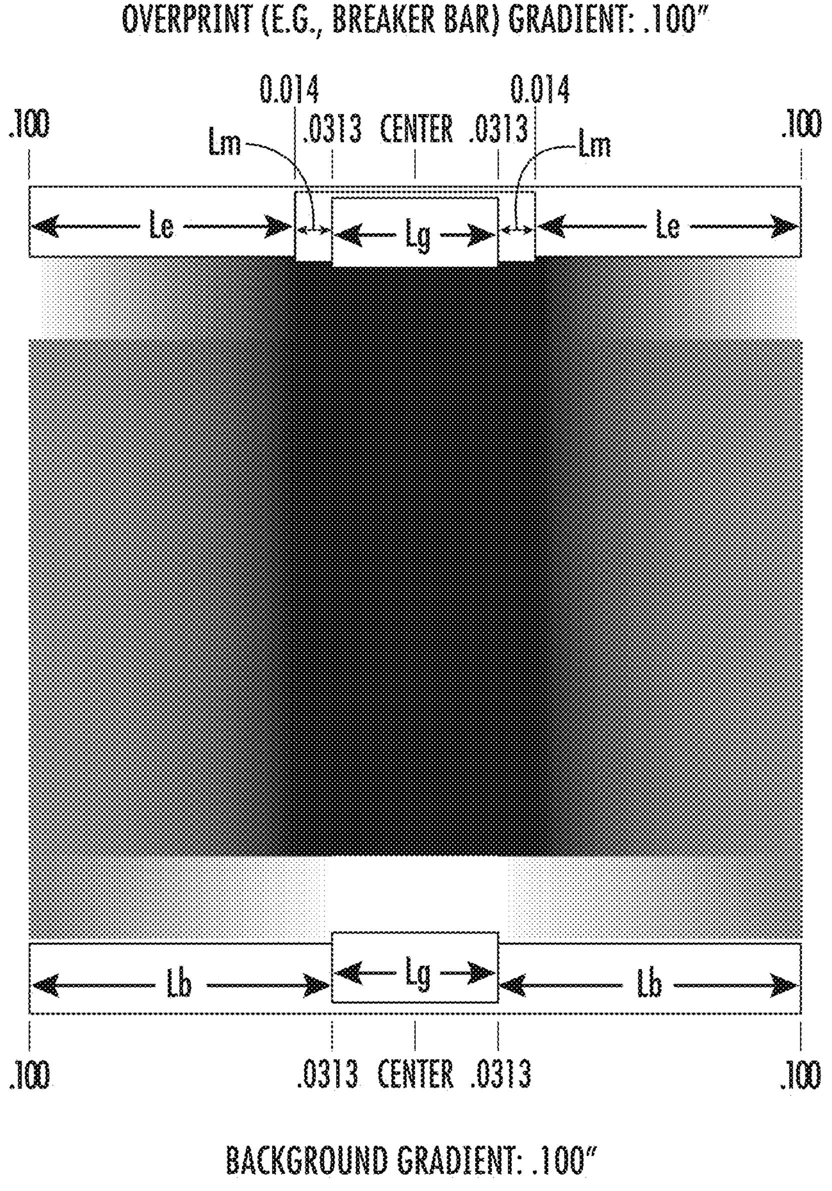
FIG. 1D schematically depicts an example of a portion of a printing configuration that can be provided by the exemplary process.

FIG. 1D schematically depicts an example of a portion of a printing configuration provided by the exemplary process 100 (FIGS. 1A-1C). Reference numbers are omitted from FIG. 1D for ease of illustration. As best understood with reference to both FIGS. 1C and 1D, FIG. 1D depicts the following features: the plate gap/break 110 and its associated length Lg, the background print edge regions 112' (depicted as a grayscale gradient) and their background gradient lengths Lb, the medial overprint 114' (schematically depicted for ease of visibility at an ink coverage value of 100% as solid black), overprint edge regions 114" (depicted as a grayscale gradient) and their overprint gradient lengths Le, and the marginal edge regions 116 of impressions 102*a*, 102*b* and their lengths Lm, wherein the marginal edge regions 116 a schematically depicted as solid black since they are superposed with the solid black depiction of the medial overprint 114'.

Light bands may appear in the printed product when one or both of the background and overprint gradient lengths Lb, Le are too short. Conversely, dark bands may appear in the printed product when one or both of the background and overprint gradient lengths Lb, Le are too short or too long. At a variety of intermediate gradient lengths Lb, Le, somewhat light bands or somewhat dark bands may appear. As mentioned above, the screen ruling may also be selected and/or adjusted to achieve the desired visual outcome.

Depending on the color used and individual preference, lighter bands may be preferable over darker bands, or darker bands may be preferable over lighter bands. In either case, the presence of these somewhat light bands or somewhat dark bands resulting from the method of the present disclosure may be preferable over conventional, more prominent trap lines, and may be considered an acceptable alternative to more costly options, such as the use of continuous, laser engraved rolls. In practice, an array of printing configurations may be prepared and evaluated for a given printing application to provide a variety of aesthetic options to choose from.

Figure 1E:
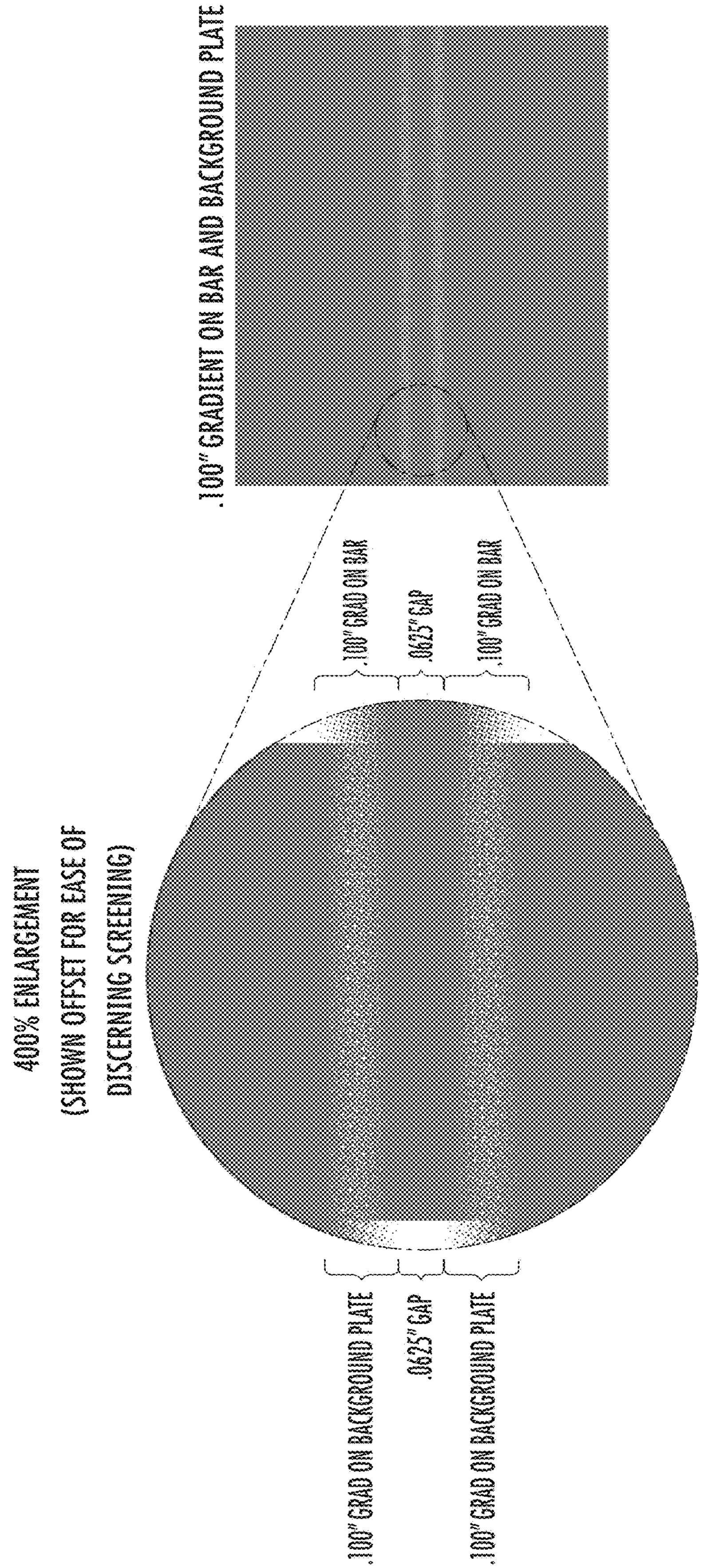
FIG. 1E schematically depicts opposite end portions of the image area of at least one printing plate (for providing the background print) superposed with a portion of the image area of a printing breaker bar (for providing the overprint at the plate gap), wherein the image areas respectively include at least partially overlapping gradient regions, in accordance with the exemplary process.

FIG. 1E schematically depicts opposite end portions of the image area (e.g., raised image area) of at least one printing (e.g., flexographic) background plate ("plate image areas") superposed with a portion of the image area (e.g., raised image area) of a printing (e.g., flexographic) breaker bar ("bar image area"), in accordance with the exemplary process 100 of this disclosure. The gap depicted in FIG. 1E at least generally corresponds to the plate gap/break 110 (FIGS. 1A-1C).

The plate image areas depicted in FIG. 1E are configured for providing respective portions of the medial background prints 112 (FIGS. 1B and 1C) and the background print gradient edge regions 112' (FIGS. 1B and 1C). As a more specific example, the plate image areas identified in FIG. 1E by "0.100" GRAD ON BACKGROUND PLATE" are configured for providing respective portions of the background print gradient edge regions 112'.

The bar image areas depicted in FIG. 1E are configured for providing respective portions of the medial overprint 114' (FIG. 1C) and the overprint gradient edge regions 114" (FIG. 1C). As a more specific example, the bar image areas identified in FIG. 1E by "0.100" GRAD ON BAR" are configured for providing respective portions of the overprint gradient edge regions 114".

Figure 2:
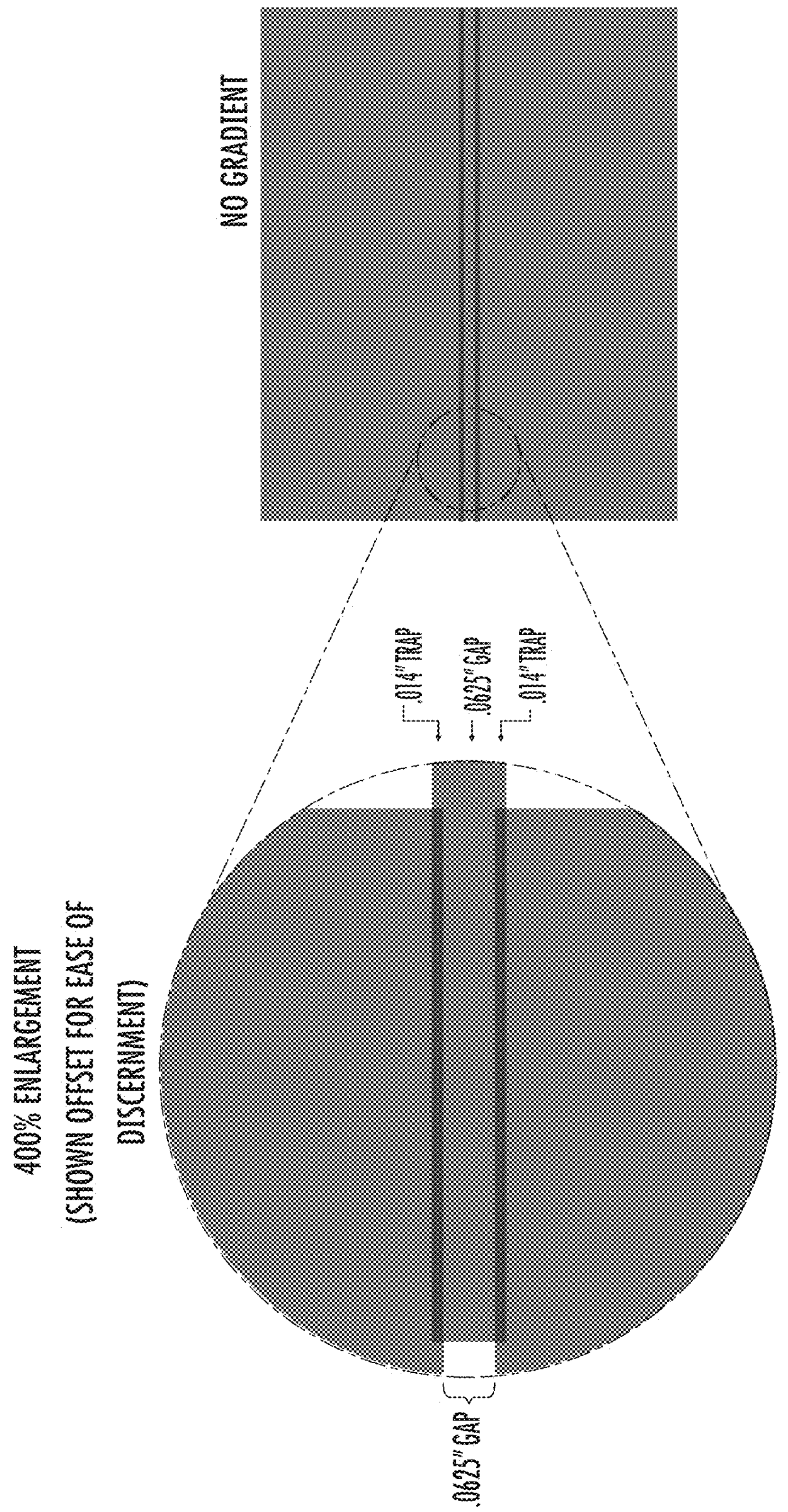
FIG. 2 schematically depicts a comparative example that is similar to FIG. 1E except, for example, the overlapping image areas of FIG. 2 lack gradient regions and, thus, form relatively dark trap lines.

FIG. 2 schematically depicts a comparative example that is similar to FIG. 1E except, for example, the overlapping image areas of FIG. 2 lack gradient regions and, thus, form relatively dark trap lines that generally correspond to and are formed by the areas identified in FIG. 2 by "0.014" TRAP". In the comparative example of FIG. 2, the image area of the background plate ("plate image areas") can be configured to provide an ink coverage value of 100%, and the image area of the breaker bar ("bar image area") can be configured to provide an ink coverage value of 100%. Therefore, the trap lines of the comparative example can have an ink total area coverage of 200%.

As apparent from comparing and contrasting FIGS. 1E and 2, the gradient edge regions 112', 114" according to the exemplary process 100 are capable of successfully reducing the more prominent appearance of typical trap lines. Notwithstanding, in some implementations of the exemplary process 100, one or more of the edge regions 112', 114" of the background print alone or in combination with respective overlapping or underlapping portions of the background print may form bands in the background print, wherein the background print comprises, consists essentially of, or consists of the medial regions 112, 114' and edge regions 112', 114". The one or more bands in the background print can be can be lighter or darker than adjacent portions of the background print (e.g., lighter or darker than at least a portion of one or more of the medial regions 112, 114' of the background print).

Other possibilities are contemplated. For instance, in the illustrated example, the background and overprint inks are the same color (e.g., the same background color). However, in some embodiments, it may be desirable to use different colors for the background and the overprint to further conceal the plate gap and/or minimize the appearance of lines in overlapping ink areas. It is further contemplated that in some instances, the present method may be used to enhance or increase the appearance of such lines, or to create various patterns or visual effects, such as wider or narrower bands, sharper or softer bands, and so on, if desired.

The present invention may be understood further by way of the following example, which should not be construed as limiting in any manner. Throughout the drawings and Detailed Description section of this disclosure, all values are approximate unless otherwise noted.

Example

Various samples were prepared using a flexographic printer to determine the effect of applying an overprint to a plate gap/break. Samples were prepared using various line screen values, background colors, widths of the impression edge gradients, and overprint area. The primary objective was to find a combination of gradients that would allow sufficient camouflaging of the breaker bar overprint to the background to avoid requiring a continuous, laser engraved roller.

A grid of background and breaker bar overprint options was created. These were configured in eight columns and eight rows. The breaker bar overprint options started at 0.01" of gradient on both sides of the bar and then progressively increased up to 0.08" in increments of 0.01". The background options also started at 0.01" of gradient on both sides of the plate break, and increased progressively to 0.08" in 0.01" increments.

Each row of the test had all the same breaker bar overprint options. Each column had all the same background options. This resulted in every combination of background and breaker bar overprint options being tested.

This test was printed on a Flexographic press at 120L, 133L, 150L, and 175L screen and in three different spot color inks. In all cases the same color ink was used for the background and the breaker bar overprint of each test.

The various samples were reviewed by several individuals. In general, numerous combinations resulted in the plate break being substantially concealed (i.e., substantially imperceptible to the naked eye by an ordinary viewer). In some instances, the lighter colors seemed to allow more overlap than the darker colors. In other instances, some of the gradients appeared too coarse for some samples and did not sufficiently camouflage the overlap. Lastly, which combination was preferred depended on the individual and the color of the ink that was used. Some preferred a slightly dark overlap, and others preferred a slightly light overlap. It was also observed that it may be advantageous to use colors (e.g., background colors) with slightly different luminosity (i.e., same color but lighter or darker) for the breaker bar overprint. Accordingly, it will be appreciated that depending on the colors used and the particular impression design, some adjustment and/or optimization of the print variables may be needed to sufficiently conceal the plate break In the above examples, the overprint impression 114, medial overprint 114', and overprint edge regions 114" have been identified as being "overprint" because they are typically printed using the breaker bar mounted to a rotary cylinder at a printing station in the flexographic printing press that is downstream from the printing station including at least one background plate (which forms the medial background print 112 and background print edge regions 112') mounted to a rotary cylinder. Alternatively, it is believed that the background plate may be positioned downstream from the breaker bar in the printing press, so that "overprint" can be replaced with "underprint" in each of "overprint impression 114", "medial overprint 114'", and "overprint edge regions 114"". Notwithstanding, in the Detailed Description section of this disclosure, the overprint impression 114, medial overprint 114', and overprint edge regions 114" have frequently been identified using the term "overprint" for ease of understanding (e.g., not for the purpose of limiting the scope of this disclosure). More generally, the overprint 114, medial overprint 114', and overprint edge regions 114" can be referred to as impression(s) and/or region(s) of an impression.

Reiterating from above with reference to the comparative example of FIG. 2, the image area of the background plate ("plate image areas") of the comparative example can be configured to provide an ink coverage value of 100%, and the image area of the breaker bar ("bar image area") of the comparative example can be configured to provide an ink coverage value of 100%; therefore, the trap lines of the comparative example can have an ink total area coverage of 200%. In contrast and in accordance with the exemplary process 100 of this disclosure, in an area where there is an overlapping or underlapping relationship between edge regions 112', 114" ("the overlapping or underlapping area of the edge regions 112', 114""), the ink total area coverage is less than 200%. In accordance with the exemplary process 100, the ink total area coverage of the overlapping or underlapping area of the edge regions 112', 114" is typically closer to 100% than 200%, for example when the ink coverage value in the medial regions 112, 114' is 100%. For example, when the ink coverage value in the medial regions 112, 114' is 100% or about 100%, the ink total area coverage of the overlapping or underlapping area of the edge regions 112', 114" can be about 100%, in a range of from about 90% to about 110%, in a range of from about 80% to about 120%, in a range of from about 70% to about 130%, in a range of from about 60% to about 140%, in a range of from about 50% to about 150%, or any ranges or values therebetween. As a more general example, the ink total area coverage of the overlapping or underlapping area of the edge regions 112', 114" can be about 100%, in a range of from about 90% to about 110%, in a range of from about 80% to about 120%, in a range of from about 70% to about 130%, in a range of from about 60% to about 140%, in a range of from about 50% to about 150%, or any ranges or values therebetween.

In the above examples, optionally it may be preferred for each of the edge regions 112', 114" to be a gradient edge region. However, this disclosure is not limited to each of the edge regions 112', 114" being a gradient edge region. For example, it is within the scope of this disclosure for any one or more of the edge regions 112', 114" to be a gradient edge region (e.g., in a manner that seeks to at least partially obscure any variation (e.g., visual variation)) between the background print in an overlap area and the background print of the medial background print region 112 and/or the medial overprint region 114').

To supplement the present disclosure, this application incorporates entirely by reference U.S. Patent Application Publication Numbers 2014/0245909 and 2016/0221329.

As an example of the breadth of this disclosure, it is within the scope of this disclosure for one or more of the terms "substantially," "about," "approximately," and/or the like, to qualify each of the adjectives and adverbs of the Detailed Description section of disclosure. Throughout the Detailed Description section of this disclosure, terms such as "substantially," "about," "proximate," and the like, have been used for the purpose of providing a range of examples.

It is believed that those of ordinary skill in the art will readily understand that, in different implementations of the features of this disclosure, reasonably different engineering tolerances, precision, and/or accuracy may be applicable. Accordingly, it is believed that those of ordinary skill will readily understand the usage herein of the terms such as "substantially," "about," "proximate," and the like.

While the present invention is described herein in detail in relation to specific aspects and embodiments, it is to be understood that this detailed description is only illustrative and exemplary of the present invention and is made merely for purposes of providing a full and enabling disclosure of the present invention and to set forth the best mode of practicing the invention known to the inventors at the time the invention was made. The detailed description set forth herein is illustrative only and is not intended, nor is to be construed, to limit the present invention or otherwise to exclude any such other embodiments, adaptations, variations, modifications, and equivalent arrangements of the present invention. All directional references (e.g., upper, lower, upward, downward, left, right, leftward, rightward, top, bottom, above, below, vertical, horizontal, clockwise, and counterclockwise) are used only for identification purposes to aid the reader's understanding of the various embodiments of the present invention, and do not create limitations, particularly as to the position, orientation, or use of the invention unless specifically set forth in the claims. Joinder references (e.g., joined, attached, coupled, connected, mounted, and the like) are to be construed broadly and may include intermediate members between a connection of elements and relative movement between elements. As such, joinder references do not necessarily imply that two elements are connected directly and in fixed relation to each other. Further, various elements discussed with reference to the various embodiments may be interchanged to create entirely new embodiments coming within the scope of the present invention. Unless otherwise noted, specific terms have been used in a generic and descriptive sense and not for purposes of limitation. Where a method claim below does not explicitly recite a step mentioned in the description above, it should not be assumed that the step is required by the claim. Furthermore, where a claim below does not expressly recite an order to be followed, it is not intended that any particular order be inferred. The use of the term "and/or" includes any and all combinations of one or more of the associated listed items.

What is claimed is:

1. A method of printing a packaging material, the method comprising:

printing, with a first plate, a first impression on a substrate so that a gradient edge region of the first impression extends along an edge of the first impression, and the gradient edge region of the first impression is positioned between the edge of the first impression and a medial region of the first impression; and printing, with a second plate, a second impression on the substrate so that a gradient edge region of the second impression extends along an edge of the second impression, and the gradient edge region of the second impression is positioned between the edge of the second impression and a medial region of the second impression, wherein the printing of the first impression with the first plate and the printing of the second impression with the second plate are cooperatively performed so that an overlap area comprises an overlapping or underlapping relationship between at least a portion of the gradient edge region of the first impression and at least a portion of the gradient edge region of the second impression, wherein the printing of the first impression with the first plate is comprised of increasing coverage of ink of the gradient edge region of the first impression in a first direction extending from the edge of the first impression toward the medial region of the first impression, so that within the overlap area the coverage of the ink of the gradient edge region of the first impression increases in the first direction, wherein the printing of the second impression with the second plate is comprised of increasing coverage of ink of the gradient edge region of the second impression in a second direction extending from the edge of the second impression toward the medial region of the second impression, so that within the overlap area the coverage of the ink of the gradient edge region of the second impression increases in the second direction, and wherein the printing of the first impression with the first plate and the printing of the second impression with the second plate are cooperatively performed so that:

the overlap area is positioned between the medial region of the first impression and the medial region of the second impression, within the overlap area both (i) the coverage of the ink of the gradient edge region of the first impression increases in the first direction and (ii) the coverage of the ink of the gradient edge region of the second impression increases in the second direction, and the second direction is different from the first direction.

2. The method according to claim 1, wherein the printing of the first impression with the first plate and the printing of the second impression with the second plate are cooperatively performed so that the overlap area has ink total area coverage in a range of from about 90% to about 110%.

3. The method according to claim 1, wherein:

the printing of the first impression with the first plate is comprised of flexographically printing the first impression using a breaker bar; and the printing of the second impression with the second plate is comprised of flexographically printing the second impression using a flexographic plate.

4. The method according to claim 1, wherein the printing of the first impression with the first plate and the printing of the second impression with the second plate are cooperatively performed so that the overlap area comprises at least the portion of the gradient edge region of the first impression overlapping at least the portion of the gradient edge region of the second impression.

5. The method according to claim 1, wherein the printing of the first impression with the first plate and the printing of the second impression with the second plate are cooperatively performed so that the overlap area comprises at least the portion of the gradient edge region of the first impression underlapping at least the portion of the gradient edge region of the second impression.

6. The method according to claim 1, wherein:

the gradient edge region of the first impression is a first gradient edge region of the first impression, the edge of the first impression is a first edge of the first impression, and the overlap area is a first overlap area;

the printing of the first impression with the first plate forms a second gradient edge region of the first impression so that the second gradient edge region of the first impression extends along a second edge of the first impression, and the second edge of the first impression is spaced apart from and opposite from the first edge of the first impression;

the method further comprises printing a third impression on the substrate so that an edge region of the third impression extends along an edge of the third impression;

the printing of the first impression with the first plate and the printing of the third impression are cooperatively performed so that a second overlap area comprises an overlapping or underlapping relationship between at least a portion of the second gradient edge region of the first impression and at least a portion of the edge region of the third impression; and the printing of the first impression with the first plate is comprised of increasing coverage of ink of the second gradient edge region of the first impression in a direction extending from the second edge of the first impression toward the medial region of the first impression.

7. The method according to claim 6, wherein:

the printing of the third impression is performed so that the edge region of the third impression is a gradient edge region extending along the edge of the third impression; and the printing of the third impression is comprised of increasing coverage of ink of the gradient edge region of the third impression in a direction from the edge of the third impression toward a medial region of the third impression.

8. The method according to claim 7, wherein the printing of the first impression with the first plate, the printing of the second impression with the second plate, and the printing of the third impression are cooperatively performed so that:

a gap is defined between the edge of the second impression and the edge of the third impression; and at least a portion of the medial region of the first impression is positioned in the gap.

9. The method according to claim 7, wherein the printing of the first impression with the first plate and the printing of the third impression are cooperatively performed so that:

the second overlap area is positioned between the medial region of the first impression and the medial region of the third impression, within the second overlap area both (i) the coverage of the ink of the second gradient edge region of the first impression increases in the direction extending from the second edge of the first impression toward the medial region of the first impression and (ii) the coverage of the ink of the gradient edge region of the third impression increases in the direction from the edge of the third impression toward the medial region of the third impression, and the direction extending from the second edge of the first impression toward the medial region of the first impression is opposite from the direction from the edge of the third impression toward the medial region of the third impression.

10. The method according to claim 9, wherein the printing of the first impression with the first plate, the printing of the second impression with the second plate, and the printing of the third impression are cooperatively performed so that:

a gap is defined between the edge of the second impression and the edge of the third impression; and at least a portion of the medial region of the first impression is positioned in the gap.

11. The method according to claim 9, wherein the printing of the first impression with the first plate and the printing of the second impression with the second plate are cooperatively performed so that second direction is opposite from the first direction.

12. The method according to claim 11, wherein the printing of the first impression with the first plate, the printing of the second impression with the second plate, and the printing of the third impression are cooperatively performed so that:

a gap is defined between the edge of the second impression and the edge of the third impression; and at least a portion of the medial region of the first impression is positioned in the gap.

13. The method according to claim 11, wherein the printing of the first impression with the first plate and the printing of the second impression with the second plate are cooperatively performed so that the overlap area has ink total area coverage of about 100%.

14. The method according to claim 13, wherein the printing of the first impression with the first plate, the printing of the second impression with the second plate, and the printing of the third impression are cooperatively performed so that:

a gap is defined between the edge of the second impression and the edge of the third impression; and at least a portion of the medial region of the first impression is positioned in the gap.

15. The method according to claim 1, wherein the printing of the first impression with the first plate and the printing of the second impression with the second plate are cooperatively performed so that second direction is opposite from the first direction.

16. The method according to claim 1, wherein the printing of the first impression with the first plate and the printing of the second impression with the second plate are cooperatively performed so that the overlap area has ink total area coverage of about 100%.

* * * * *